US011354639B2

(12) United States Patent
Vadapandeshwara et al.

(10) Patent No.: US 11,354,639 B2
(45) Date of Patent: Jun. 7, 2022

(54) PIPELINE MODELER SUPPORTING ATTRIBUTION ANALYSIS

(71) Applicant: Oracle Financial Services Software Limited, Mumbai (IN)

(72) Inventors: Rajaram Narasimha Vadapandeshwara, Bangalore (IN); Pramit Dey, Kolkata (IN)

(73) Assignee: Oracle Financial Services Software Limited, Goregaon (East) (IN)

(*) Notice: Subject to any disclaimer, the term of this patent is extended or adjusted under 35 U.S.C. 154(b) by 0 days.

(21) Appl. No.: 17/333,747

(22) Filed: May 28, 2021

(65) Prior Publication Data
US 2022/0043730 A1  Feb. 10, 2022

(30) Foreign Application Priority Data

Aug. 7, 2020 (IN) .............................. 202041033834

(51) Int. Cl.
*G06Q 20/20* (2012.01)
*G06F 11/30* (2006.01)
(Continued)

(52) U.S. Cl.
CPC .......... *G06Q 20/203* (2013.01); *G01S 13/953* (2013.01); *G06F 11/3079* (2013.01);
(Continued)

(58) Field of Classification Search
CPC .... G06Q 20/203; G06Q 20/20; G06Q 20/208; G06Q 20/209; G06Q 10/0639;
(Continued)

(56) References Cited

U.S. PATENT DOCUMENTS 7,853,466 B2 * 12/2010 Wu ...................... G06Q 20/203
705/7.38
10,255,622 B2  4/2019 Scarasso et al.
(Continued)

FOREIGN PATENT DOCUMENTS

| CN | 109509107 A | 3/2019 |
| CN | 110796399 B | 5/2020 |
| WO | 03017683 A2 | 2/2003 |

OTHER PUBLICATIONS

"Attribution Analysis", Available Online at: https://corporatefinanceinstitute.com/resources/knowledge/trading-investing/attribution-analysis/, Accessed from Internet on Aug. 18, 2020, pp. 1-5.
(Continued)

*Primary Examiner* — Kyung H Shin
(74) *Attorney, Agent, or Firm* — Kilpatrick Townsend & Stockton LLP

(57) ABSTRACT

Techniques are disclosed for attribution analysis in analytical workflows. A data processing system (DPS) obtains an overall model comprising one or more sub-models. The DPS selects an output variable of the overall model for which attribution of changes is to be performed, and a plurality of input variables against which changes are to be attributed to. The overall model is initially executed with respect to a data set of values for the plurality of input variables to generate a base result for the output variable. The overall model is iteratively executed based on a condition associated with the plurality of input variables to obtain a new result for the output variable. In each iteration, a value of an input variable is changed with respect to the data set of values and a change in the output variable with respect to the base result is attributed to the corresponding input variable.

20 Claims, 8 Drawing Sheets

(51) Int. Cl.
*H04L 67/133* (2022.01)
*G06N 20/00* (2019.01)
*G01S 13/95* (2006.01)
*G06Q 10/06* (2012.01)
*G07C 5/02* (2006.01)
*G06N 5/02* (2006.01)
*G07C 5/08* (2006.01)
*G06Q 20/30* (2012.01)
*G06Q 10/08* (2012.01)

(52) U.S. Cl.
CPC ....... *G06N 20/00* (2019.01); *G06Q 10/06393* (2013.01); *H04L 67/40* (2013.01); *G06N 5/02* (2013.01); *G06Q 10/06* (2013.01); *G06Q 10/0639* (2013.01); *G06Q 10/087* (2013.01); *G06Q 20/208* (2013.01); *G06Q 20/209* (2013.01); *G06Q 20/30* (2013.01); *G07C 5/02* (2013.01); *G07C 5/0825* (2013.01); *G07C 5/0841* (2013.01)

(58) Field of Classification Search
CPC ................ G06Q 10/087; G06Q 10/06; G06Q 10/06393; G07C 5/02; G07C 5/0825; G07C 5/0841; G01S 13/953; G06F 11/3079; G06N 20/00; H04L 67/40
See application file for complete search history.

(56) References Cited

U.S. PATENT DOCUMENTS

| | | |
|---|---|---|
| 2006/0241923 A1 | 10/2006 | Xu et al. |
| 2010/0245165 A1* | 9/2010 | Kauffman ............. G01S 13/953 342/26 B |
| 2011/0251951 A1 | 10/2011 | Kolkowitz et al. |
| 2021/0012263 A1* | 1/2021 | Li .................... G06Q 10/06393 |

OTHER PUBLICATIONS

"ImpairmentStudio™ for IFRS 9", Moody's Analytics, Available Online at: https://www.moodysanalytics.com/-/media/products/moodys-analytics-impairmentstudio-for-ifrs9-content-brochure-format.pdf, Dec. 31, 2018, pp. 1-5.

"Maplesoft—Statistics and Data Analysis", Available Online at https://www.maplesoft.com/products/maple/features/statistics.aspx. Accessed from Internet on Aug. 18, 2020, pp. 1-22.

* cited by examiner

PIPELINE MODELER SUPPORTING ATTRIBUTION ANALYSIS

CROSS-REFERENCES TO RELATED APPLICATIONS

The present application claims the benefit and priority of India Provisional Application No. 202041033834 filed on Aug. 7, 2020, the entire contents of which are incorporated herein by reference for all purposes.

FIELD

The present disclosure relates generally to a data processing system, and more particularly, to techniques of performing attribution analysis of complex analytical workflows by the data processing system.

BACKGROUND

With the popularization of the Internet, companies in various industries produce and process massive amounts of data at all times. In order to utilize the data, different companies extract a large number of different data indexes from the data according to the business preference of the companies, and the data indexes are used for measuring the business development conditions of the companies. For example, in an e-commerce website application, the data indexes for measuring company services may comprise factors such as a number of active user visits on a webpage per day, a click rate of users, a conversion rate per webpage, etc.

Attribution analysis (i.e., determining an effect of changing an input variable in a complex business operation on one or more output variables) is typically performed to assess the business development of the companies. Generally, attribution analysis is performed via statistical modeling techniques or through an application specific proprietary extension that operates as black box. Such black boxes are typically not open for introspection i.e., do not provide useful insights into the functioning of the model(s). Further, the proprietary extensions are not configurable for specific use cases. Attribution analysis is typically limited to a single equation, and there is an inability to perform attribution on complex equations (e.g., sequential computations including several equations). Moreover, there is an inability to perform attribution analysis on processes and models that are external to the system.

Embodiments described herein address these and other problems, individually and collectively.

SUMMARY

Techniques are provided (e.g., a method, a system, non-transitory computer-readable medium storing code or instructions executable by one or more processors) for performing attribution analysis in complex analytical workflows. Various embodiments are described herein, including methods, systems, non-transitory computer-readable storage media storing programs, code, or instructions executable by one or more processors, and the like.

In various embodiments, a method is provided that comprises: obtaining, by a data processing system, an overall model comprising one or more sub-models that are executed in a predetermined order to determine at least one output variable of the overall model. The data processing system selects an output variable of the overall model for which attribution of changes is to be performed, and a plurality of input variables against which changes are to be attributed to. The overall model is initially executed by the data processing system by: (i) obtaining a data set of values for the plurality of input variables, (ii) executing the one or more sub-models in the predetermined order based on the data set of values for the plurality of input variables, and (iii) generating a base result for the output variable of the overall model based on the executing of the one or more sub-models. The data processing system iteratively executes the overall model, wherein each iterative execution of the overall model comprises: (i) selecting an input variable from the plurality of input variables, wherein the input variable selected is different in each iteration, (ii) generating a new data set of values for the plurality of input variables, wherein a value of the input variable in the new data set of values is different that the value of the input variable in the data set of values for the plurality of input variable, and values of each remaining input variable in the new data set of values is same as the values of each remaining input variables in the data set of values for the plurality of input variables, (iii) executing the one or more sub-models in the predetermined order based on the new data set of values for the plurality of input variable, (iv) generating a new result for the output variable of the overall model based on the executing of the one or more sub-models, (v) determining a difference between the base result and the new result, and (vi) attributing the difference to the input variable selected. A report is generated to be provided to a user, wherein the report includes change in value of each input variable of the plurality of input variables, and associated change in the output variable of the overall model.

In some embodiments, the overall model is executed iteratively N times, wherein N is a number of input variables of the plurality of input variables, and the output variable is a function of the plurality of input variables.

In some embodiments, executing the one or more sub-models in the predetermined order includes executing a first subset of the one or more sub-models concurrently, and executing a second subset of the one or more sub-models sequentially.

In some embodiments, the data set of values for the plurality of input variables is obtained via an application programming interface from one or more data sources external to the data processing system.

In some embodiments, initially executing the overall model by the data processing system, further comprises: obtaining one or more reference data sets of values for the plurality of input variables; executing the one or more sub-models with respect to each reference data set of values for the plurality of input variables to obtain a reference result of the output variable of the overall model; computing an average reference result based on reference results corresponding to the one or more reference data sets of values for the plurality of input variables; determining a first difference between the base result and the average reference result; and utilizing the data set of values for the plurality of input variables in initial execution of the overall model in response to the first difference being less than a threshold value.

In some embodiments, iteratively executing the overall model, by the data processing system, further comprises obtaining, via an application programming interface, a first change in an output value of at least one sub-model with respect to the new data set of values for the plurality of input variables.

In some embodiments, the data processing system is further configured for determining whether the first change in the output value of at least one sub-model is greater than a threshold value; and responsive to the first change being greater than the threshold value, generating a message to be transmitted to the user, the message indicating that a re-training of the at least one sub-model is to be performed.

In some embodiments, a computing device is provided that includes a processor, and a memory including instructions that, when executed with the processor, cause the computing device to, at least: obtain an overall model comprising one or more sub-models that are executed in a predetermined order to determine at least one output variable of the overall model; select an output variable of the overall model for which attribution of changes is to be performed, and a plurality of input variables against which changes are to be attributed to; initially execute the overall model by: (i) obtaining a data set of values for the plurality of input variables, (ii) executing the one or more sub-models in the predetermined order based on the data set of values for the plurality of input variables, and (iii) generating a base result for the output variable of the overall model based on the executing of the one or more sub-models; iteratively execute the overall model, wherein each iterative execution of the overall model comprises: (i) selecting an input variable from the plurality of input variables, wherein the input variable selected is different in each iteration, (ii) generating a new data set of values for the plurality of input variables, wherein a value of the input variable in the new data set of values is different that the value of the input variable in the data set of values for the plurality of input variable, and values of each remaining input variables in the new data set of values is same as the values of each remaining input variable in the data set of values for the plurality of input variable, (iii) executing the one or more sub-models in the predetermined order based on the new data set of values for the plurality of input variable, (iv) generating a new result for the output variable of the overall model based on the executing of the one or more sub-models, (v) determining a difference between the base result and the new result, and (vi) attributing the difference to the input variable selected; and generate a report to be provided to a user, wherein the report includes change in value of each input variable of the plurality of input variables, and associated change in the output variable of the overall model.

In some embodiments, there is provided a non-transitory computer readable medium storing specific computer-executable instructions that, when executed by a processor, cause a computer system to at least: obtain an overall model comprising one or more sub-models that are executed in a predetermined order to determine at least one output variable of the overall model; select an output variable of the overall model for which attribution of changes is to be performed, and a plurality of input variables against which changes are to be attributed to; initially execute the overall model by: (i) obtaining a data set of values for the plurality of input variables, (ii) executing the one or more sub-models in the predetermined order based on the data set of values for the plurality of input variables, and (iii) generating a base result for the output variable of the overall model based on the executing of the one or more sub-models; iteratively execute the overall model, wherein each iterative execution of the overall model comprises: (i) selecting an input variable from the plurality of input variables, wherein the input variable selected is different in each iteration, (ii) generating a new data set of values for the plurality of input variables, wherein a value of the input variable in the new data set of values is different that the value of the input variable in the data set of values for the plurality of input variable, and values of each remaining input variables in the new data set of values is same as the values of each remaining input variable in the data set of values for the plurality of input variable, (iii) executing the one or more sub-models in the predetermined order based on the new data set of values for the plurality of input variable, (iv) generating a new result for the output variable of the overall model based on the executing of the one or more sub-models, (v) determining a difference between the base result and the new result, and (vi) attributing the difference to the input variable selected; and generate a report to be provided to a user, wherein the report includes change in value of each input variable of the plurality of input variables, and associated change in the output variable of the overall model.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
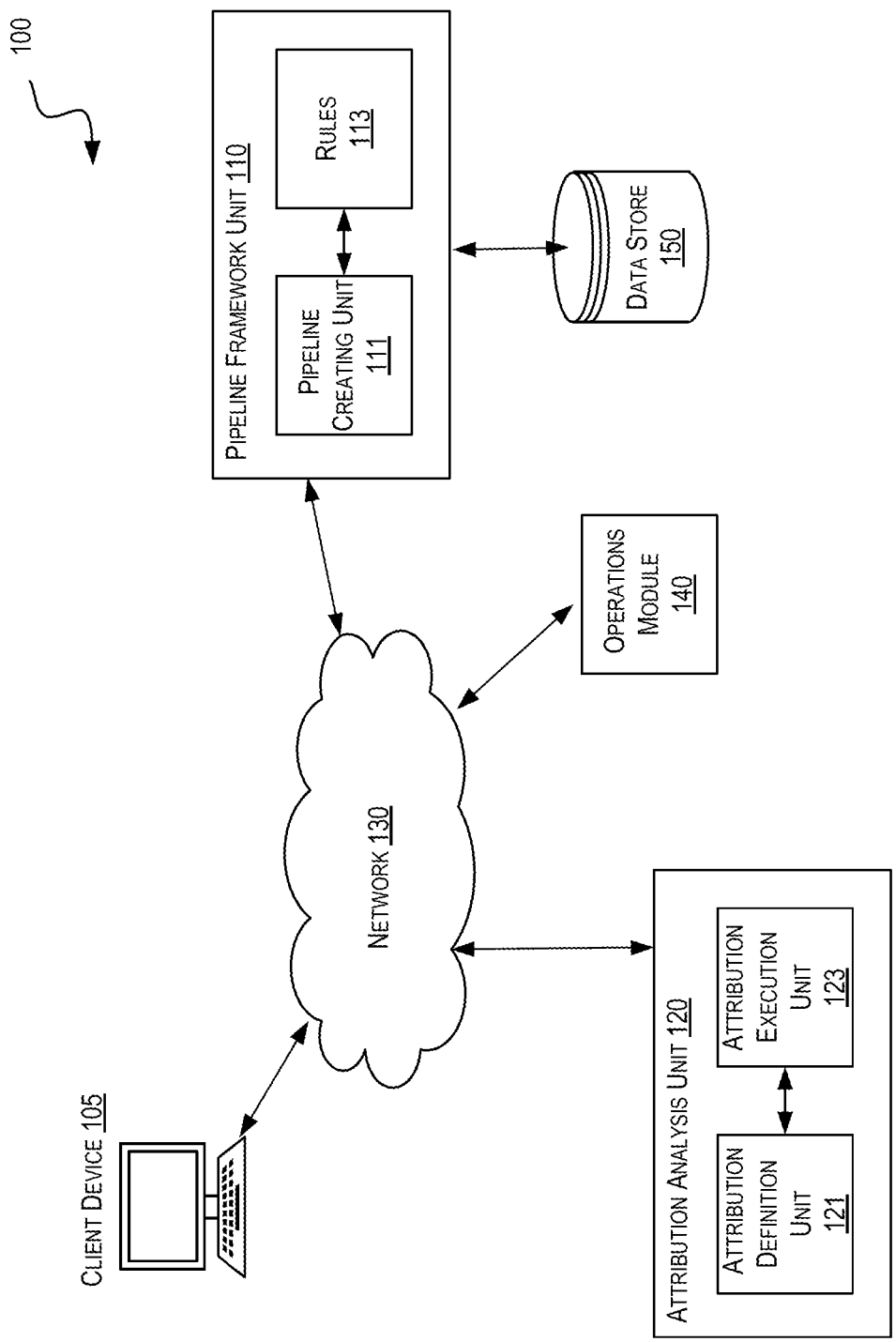
FIG. 1 is an illustration of a data processing system in accordance with various embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Overview of a Data Processing System-Attribution Analysis

Enterprises typically require constant monitoring of workflows to measure risk in order to conform to prevalent regulatory and supervisory standards. In such workflows, measurement often entails significant computations and validations with an enterprise's data. Data is transformed to support such measurements and calculations. The processing involved in the transformation of data includes large volumes of time-period data, and whose processing methodology is described as a series of tasks that perform data transformations and actions (including inserts/updates of computed values), which may be achieved through a set of defined rules.

A complex analytical workflow is modeled as an overall model (e.g., a machine-learning model) that constitutes several sub-models. Specifically, the several sub-models are stitched together (i.e., combined) in a predetermined manner to generate the overall model. The sub-models are executed in a predetermined order to determine one or more output variables of the overall model. Each sub-model includes a series of tasks that operate on one or more datasets and perform data transformations to compute the one or more output variables of the overall model. Thus, an execution of the overall model includes: (i) determining a plurality of input variables (i.e., input parameters to the one or more sub-models), (ii) executing the one or more sub-models in accordance with the predetermined order, and (iii) generating one or more output variables of the overall model. A requirement in such complex analytical workflows is that of performing attribution analysis. Attribution analysis is defined herein as a process by which one can ascertain i.e. determine, how a change in value of an independent variable (e.g., the input variables to the sub-models) affects the value of a dependent variable (e.g., the output variables of the overall model). Described herein are mechanisms to perform attribution analysis in complex analytical workflows.

The various embodiments described herein may be used in an assortment of different domains and contexts. Certain embodiments are particularly applicable to enterprise application software provided in distributed computing technology. However, the systems and methods described herein may be used to provide data transformation functionality for any system or application framework where one can ascertain how a change in the value of each independent variable affects the value of the dependent variable(s).

Techniques (e.g., systems, methods, and machine-readable media) are disclosed to enable a data processing system to define a sub-model to include a series of tasks that perform data transformations. Further, several sub-models can be stiched together to generate an overall model. FIG. 1 depicts a data processing system 100 comprising a client device 105, a pipeline framework unit 110, an attribution analysis unit 120, a network 130, an operations module 140, and a data storage 150 (e.g., memory store) in accordance with various embodiments. The pipeline framework unit 110 includes a pipeline creating unit 111 and a rules unit 113. The attribution analysis unit 120 includes an attribution definition unit 121 and an attribution execution unit 123.

A user operating the client device 105 may be presented one or more application interfaces (e.g., graphical user interfaces) that accept input to enable the user to interact with the pipeline framework unit 110 and/or the attribution analysis unit 120. Examples of a client device 105 include, without restriction, a workstation, personal computer (PC), laptop computer, mobile device such as a smart phone, wearable computer, or other networked electronic device. The interface presented at the client device 105 may be accessible using an application executing on the client device 105. The client device 105, the pipeline framework unit 110, the attribution analysis unit 120, and the operations module 140 may communicate via one or more communication networks 130. Examples of communication networks 130 may include a mobile network, a wireless network, a cellular network, a local area network (LAN), a wide area network (WAN), other wireless communication networks, or combinations thereof.

The pipeline framework unit 110 facilitates the user to define the overall model. The pipeline framework unit 110 includes the pipeline creating unit 111, and the rules unit 113. By some embodiments, the pipeline creating unit 111 provisions the user to define the overall model as a pipeline (also referred to herein as a workflow) i.e., a combination of one or more sub-models that are stitched/combined together to form the overall model. The pipeline framework unit 110 also provisions the user to define and execute a set of rules, reporting objects, and processes that are required to transform data in the data processing system 100. The pipeline creating unit 111 provides an interface that allows the user via, for example, the client device 105, to define and execute rules, processes, and to manage definitions of each sub-model that is used to form the overall model. For example, many enterprises require constant monitoring and measurement of risk in order to conform to prevalent regulatory and supervisory standards. These measurement often entail significant computations and validations with an enterprise's data. The data is frequently transformed to support such measurements and calculations. These data transformation may be achieved through a set of defined rules. The pipeline creating unit 111 provisions the user to define the rules 113 for executing the overall model e.g., define an execution order of the one or more sub-models that form the overall model. For example, a rule may include a first subset of the one or more sub-models being executed concurrently, while a second subset of the one or more sub-models is executed sequentially in order to determine one or more output variables of the overall model. Details pertaining to the sub-model and the overall model are described herein with reference to FIGS. 2 and 3. Additionally, the pipeline creating unit 111 also provisions the user to define, via an application interface, one or more datasets that are to be obtained e.g., from external data sources with respect to which the overall model is to be evaluated. Such datasets can be obtained via the operations module 140 from the external data sources.

The rules unit 113 facilitates a user to define a set of rules, report objects, and processes that are implemented (e.g., with respect to a sub-model) to transform data in a storage device such as data storage 150. For example, the rules unit 113 provides a framework that facilitates the definition and maintenance of a transformation. A metadata abstraction layer may be used in the definition of rules where the user is permitted to re-classify the attributes in the data store 150 thus transforming the data. The underlying metadata objects such as hierarchies that are non-large or non-list, datasets and processors drive the rule functionality. Rules may include various types. For example, a Type 1 rule may involve creating a subset of records from a given set of records in the data model based on certain filters. This process can involve transformations, aggregation, or a combination thereof. Type 1 rule definitions may be achieved through a Table-to-Table (T2T) Extract. Type 2 rules may involve re-classification of records in a table in a data model based on criteria that include complex group-by clauses & sub-queries within the tables. Type 3 rules may involve computations of a new value or metric based on a simple measure and updating an identified set of records within the data model with the computed value. The pipeline creating unit 111 includes of a set of tools, which help a user to operate with the various rule definitions.

In various embodiments, the rules are defined to include one or more components. The components may include a dataset, a source, a target, a mapping, and/or node identifier. A dataset is a set of tables that are joined together by keys.

A dataset may have at least one fact table. Fact tables store measurements, metrics or facts of a process. A fact table may be located at the center of a star schema or a snowflake schema surrounded by dimension tables. Dimensions tables store reference data (e.g., a list of products, list of branches, list of geographies, list of currencies, etc., that an entity deals with are relatively static). Where multiple fact tables are used, these can be arranged as a fact constellation schema. A fact table typically has two types of columns: those that contain facts and those that are a foreign key to dimension tables. The primary key of a fact table is usually a composite key that is made up of all of its foreign keys. Fact tables contain the content of the data store 150 and store different types of measures like additive, non-additive, and semi additive measures. Type 3 rule definitions may be based on datasets that contain more than one fact table. Type 2 rule definitions may be based on datasets that contain a single fact table. The values in one or more columns of the fact tables within a dataset may be transformed with a new value.

According to some embodiments, a set of rules collectively form a process. A process definition may be represented as a process tree. The rules unit 113 included in the pipeline framework unit 110 provides a framework that facilitates the definition and maintenance of a process. By defining a process, a user can logically group a collection of rules that pertain to a functional process. For example, a user can define a process with the existing metadata objects using a hierarchical structure, which facilitates the construction of a process tree. A process tree can have many levels and one or many nodes within each level. In this manner, the pipeline framework unit 110 can utilize the rules unit 113 to define a process for a sub-model of the complex analytical workflow. It is appreciated that a sub-model can include one or more tasks, each of which is to be executed in order to complete the execution of the sub-model. Sub-processes (e.g., of tasks of the sub-model) may be defined at level members and process hierarchy members form the leaf members of the tree. Thus, processes may include two types: (i) an end to end process, which denotes functional completeness and is ready for execution, and (ii) non-end to end process, which is a logical collection of rules and cannot be executed by itself. The non-end to end process may be defined as a sub-process in an end-to-end process to be executed. The rules unit 113 may be used to build a process tree by adding one or more members called process nodes. If there are predecessor tasks associated with any member, the tasks defined as predecessors precede the execution of that member.

The definitions created by the rules unit 113 result in a unique batch group. These batches could then be scheduled for execution via an interface provided by the pipeline framework unit 110. Every request for execution of a process (e.g., execution of a sub-model) may become a batch in a batch group. The pipeline framework unit 110 enables a user to have a workflow for executing the process. By some embodiments, the batches can then be executed from the operations module 140. For example, a user may select via the application programming interface (API), a process definition, which is to be marked for execution, where the name of the selected process definition appears in a run description textbox of the API. The API displays other information e.g., options such as the request execution ID, request execution description, request status, execution status, and edit.

The API may have options to select batches that are defined for execution. The request status "open" indicates that the selected process ID is ready for execution. The execution status "not started" indicates that the particular process definition/batch has not yet been executed. A user can selected the edit option to edit a request for execution. A user can also make use of a search and filter option to search for specific processes based on process name, process execution description, process execution ID, process type, request status, etc. A pagination option can also be provided to aid the user to manage a collaborated view of existing processes within the data processing system.

By some embodiments, the operation module 140 facilitates a user in administration and processing of data (e.g., enterprise data) to create the highest level of efficiency within the data processing system 100 and to derive results based on one or more specified rules. The operation module 140 may include units such as batch maintenance, batch execution, batch scheduler, batch monitor, batch processing report, batch cancellation, view log, and report generation.

The batch maintenance framework within the operation module 140 facilitates a user to create and maintain the batch definitions. The user can process the batch scheduled for execution from batch maintenance and also from other modules such as an advanced analytics infrastructure module (not shown) and the rules unit 113. The batch execution unit of the operations module 140 is configured to initiate a batch for processing. By some embodiments, when a batch is submitted for execution, a series of commands are transmitted to the data store 150 with respect to the defined components and parameters. This in turn returns an array of update counts (e.g., value definitions) when the commands are executed successfully. The batch scheduler unit in the operations module 140 facilitates a user to schedule a batch for later processing. The user can define a new batch schedule or update a previously defined batch schedule for processing.

The batch monitor unit of the operations module 140 facilitates a user to view the status of executed batch definitions along with the tasks details. A user can track the issues if any, on regular intervals and ensure smooth batch execution. An event log provides the user with real time status of the executed batches. The batch processing report in the operations module 140 facilitates a user to view the execution status of each task component defined in a batch. Batch cancellation unit of the operations module 140 facilitates a user to cancel or abort a batch, or a specific task, which is either scheduled or is in the process of execution. The view log unit facilitates a user to view the execution status of each task component defined in a batch. The report generation unit of the operations module 140 is configured to generate an attribution analysis (described later) report to be provided to the user.

The attribution analysis unit 120 is configured to perform attribution analysis on the complex analytical workflow(s) set up by the pipeline framework unit 110. Attribution is defined herein as a process by which one can ascertain how a change in the value of an independent variable affects the value of one or more dependent variables. Dependent variables are variables whose change depends solely on another variable—usually the independent variable. That is, the value of the dependent variable changes only if the independent variable changes. The direction of this change (i.e., increase or decrease in the value) is usually determined by a function which represents the relationship between the dependent and independent variable. Independent variables are variables whose variations do not depend on another variable. The independent variables are controlled inputs, whose variation depends on the individual working with the variables i.e., user controlled or the variation of the independent variable may be determined by one or more external events.

The attribution analysis unit 120 includes the attribution definition unit 121 and the attribution execution unit 123. By some embodiments, the attribution definition unit 121 provides a framework to facilitate a user to define an overall model corresponding to a complex analytical workflow. For instance, the overall model may comprise a plurality of sub-models which are stitched together i.e., combined to form the overall model. In the process of attribution analysis, the independent variables correspond to input variables of the one or more sub-models that are combined to form the overall model, whereas the dependent variables correspond to the one or more output variables of the overall model. The attribution definition unit 121 provides an interface to the user to define the one or more input variables of the sub-models as well as the one or more output variables of the overall model.

According to some embodiments, the attribution definition unit 121 provides for the following features:

1. Ability to register a process/model and capturing the following details:

Model Name, purpose, and description—to identify the model.

Input parameters—specify a list of inputs variables used in the process to compute the output, to identify potential attributable variables, etc.

Output variable(s)—List of output variables

Data preparation API—specify data sources from which values of input variables are to be retrieved Input/Output Data Transfer API—applicable to transfer/receive data from one or more models external to the data processing system 2. Choice of variables—provides a choice to the user to select the output variables (e.g., of the overall model) for which attribution is to be performed and the input variables (e.g., of the one or more sub-models) against which the changes are to be attributed to.

The sub-models/overall model defined via the attribution definition unit 123 are setup as a workflow (that can be monitored by the user via an API) by the pipeline framework unit 110. The attribution execution unit 123 provides a framework to facilitate the user (via a user interface) to execute the workflow. For instance, each execution of the overall model may be referenced via a key e.g., a run-time key that identifies a time instance at which the overall model is executed. Thus, the attribution execution unit 123, for example, provides the user an option to select two executions of the overall model (e.g., run-time key 1 and run-time key 2) where a change in the value of a dependent variable (e.g., output of the overall model) is to be attributed to change in one of the input variables of the sub-models. Details pertaining to the attribution execution process are described herein with reference to FIG. 4. The attribution execution unit 123 provides for the following features:

Compute a difference between the outputs of the overall model in different executions i.e., while varying the value of one input variable between consecutive executions.

Perform Attribution reporting process—e.g., generate a report based on the execution of the overall model to be presented to the user, where the report includes change in value of each input variable of the plurality of input variables, and associated change in the output variable of the overall model.

Embodiments of the present disclosure provide techniques for executing an overall model (and associated sub-models) using the attribution analysis unit 120 that is capable of incrementally (one at a time) attributing a quantum of change in one dependent variable to changes in one or more independent variables. The dependent variable is a function of the aforementioned independent variables and is an end result of a single or multiple processes that may run either in parallel or serially. In what follows, there is provided a detailed description of a sub-model and an overall model of the complex analytical workflow, followed by a description of an attribution analysis process performed by the attribution execution unit 123 of the attribution analysis unit 120.

Figure 2:
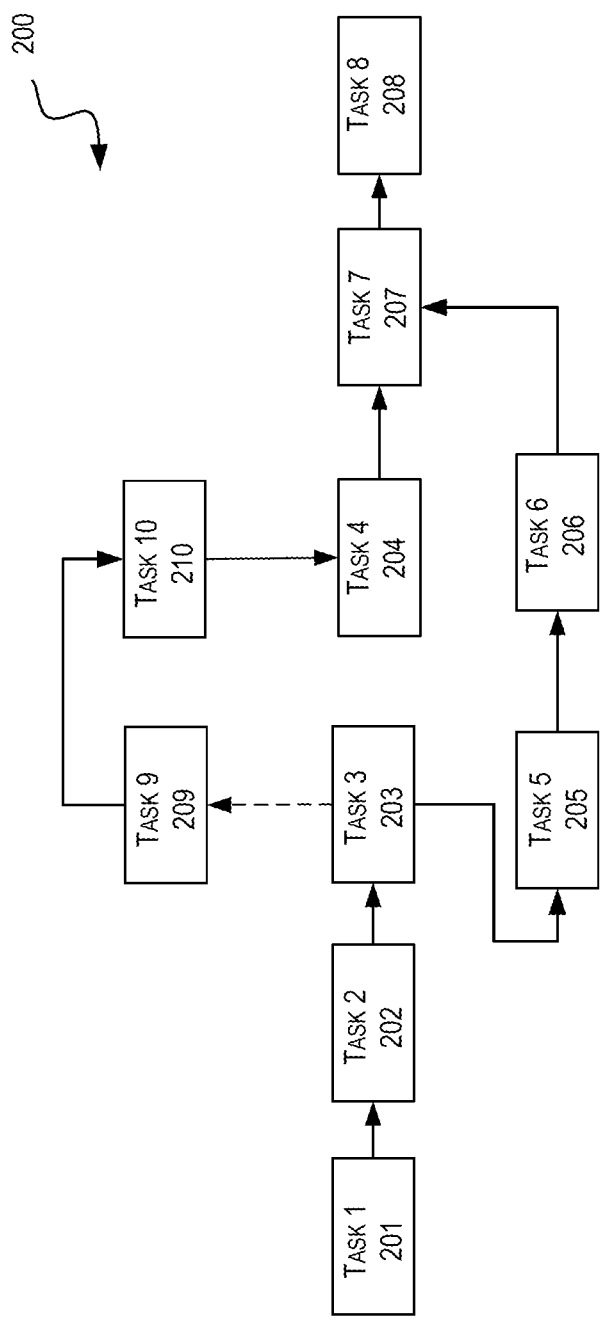
FIG. 2 is an illustration of a sub-model in accordance with various embodiments.

FIG. 2 depicts an illustration of a sub-model 200 in accordance with various embodiments. The sub-model includes a number of tasks or processes configured to capture the value of independent variables in order to calculate a dependent variable (e.g., output data of the process train). It is appreciated that the output of a sub-model may serve as an input to another sub-model or may correspond to an output of an overall model that is formed by combining two or more sub-models. For sake of description, an execution of a sub-model is also referred to herein as a 'run' of the sub-model.

As shown in FIG. 2, the sub-model 200 includes a plurality of tasks i.e., task 1 to task 10, 201-210. The plurality of tasks i.e., task 1, 201 to task 10, 210 form a process train that is configured to transform input data to generate output data of the sub-model e.g., output of task 8. In some instances, the sub-model is executed as a batch process. In other instances, as shown by the dashed line in FIG. 2 (i.e., line connecting task 3 and task 9), the sub-model can be an event driven process e.g., an online process external to the sub-model, where some tasks are triggered by different one or more events happening in other processes or task. The output of the sub-model i.e., output of task 8 may serve as an input to another sub-model or may be an output of an overall task.

Figure 3:
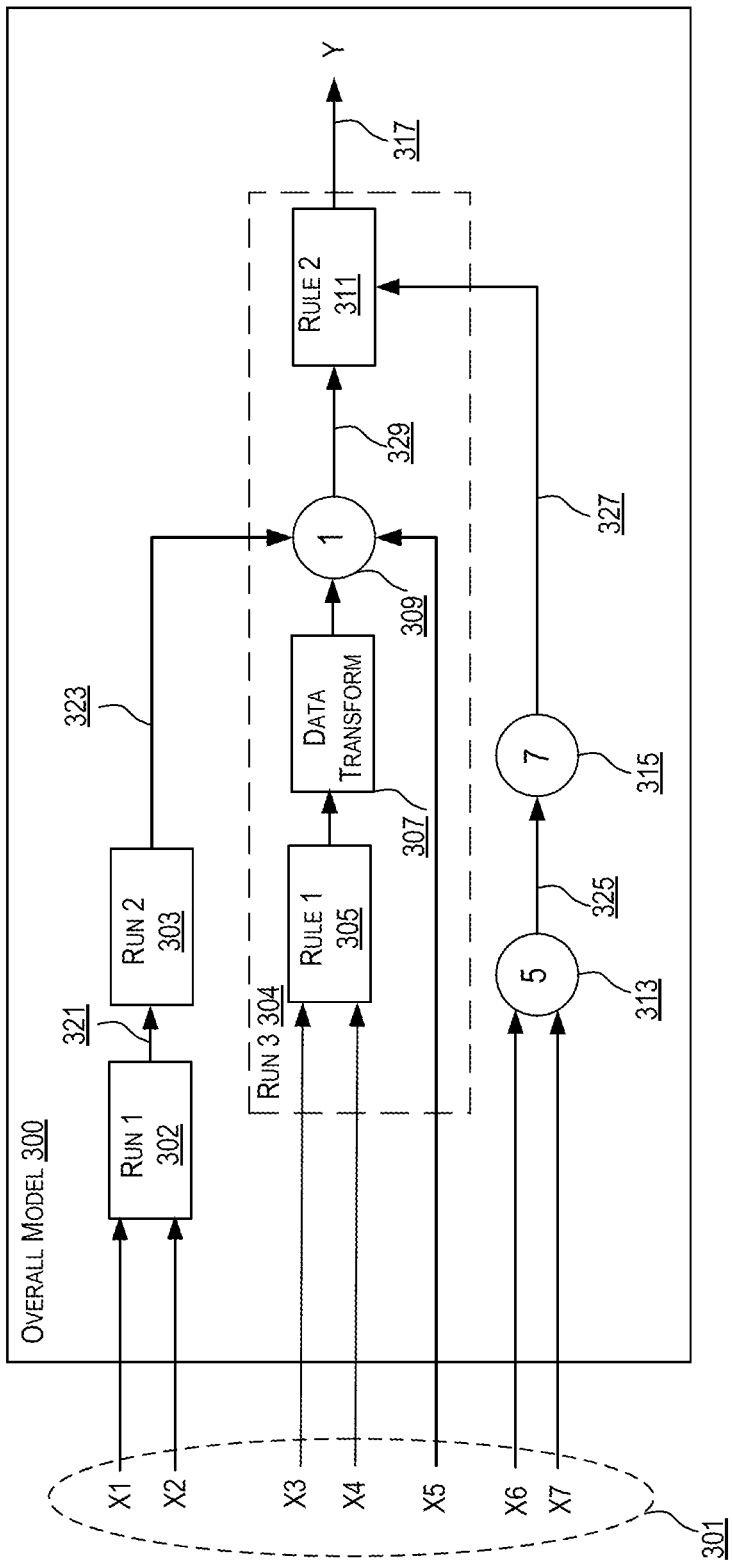
FIG. 3 is an illustration of an overall model in accordance with various embodiments.

Turning to FIG. 3, there is depicted an illustration of an overall model 300 in accordance with various embodiments. The overall model 300 is formed by stitching together i.e., combining, multiple sub-models e.g., sub-model 1 (Run 1) 302, sub-model 2 (Run 2) 303, and sub-model 3 (Run 3) 304, and independent or standalone processes (e.g., standalone process 1 (309), standalone process 5 (313) and standalone process 7 (315)). The sub-models and the standalone processes are configured to capture the value of independent variables 301 (e.g., input variables X1-X7) in order to calculate a final dependent variable (e.g., Y or the output variable of the overall model).

As shown in the example depicted in FIG. 3, input variables X1 and X2 are input variables to sub-model 1 (i.e., run 1, 302), whereas input variables X3, X4, and X5 are input variables to sub-model 3 (i.e., run 3, 304), and input variables X6 and X7 are inputs to the standalone process 5, 313. The output of sub-model 1, 321 serves as an input to sub-model 2, and the output of sub-model 2 is fed as input to the standalone process 1, 309, which is a part of sub-model 3, 304. In a similar manner, the output 325 of standalone process 5, 313, serves as an input to standalone process 7, 315, where the output 327 of standalone process 7, 315 is input to rule 2, 311, which is a sub-process included in sub-model 3, 304. Sub-model 3, 304 includes a combination of various rules (e.g., rule 1, 305, and rule 2, 311), data transform mechanisms 307, and standalone processes e.g., standalone process 1, 309. The rules serve as complex conditions that result in data transform of input variables X3 and X4. Rule 2, 311 of sub-model 3 operates on the outputs 329 and 327 of the standalone process 1, 309, and standalone process 7, 315, respectively. The output 317 of sub-model 3 is the output variable of the overall model 300. It is appreciated that the overall model 300 as depicted in FIG. 3 may be constructed as a workflow that can be monitored in real-time by the pipeline framework unit 110 of FIG. 1. Furthermore, it is appreciated that a change in the value of any one or more input variables X1-X7, 301, results in a change in the output variable Y, 317 of the overall model, as well as a change in an intermediate output of a sub-model e.g., changing input variable X1 will result in a change in the output of sub-model 1 (321) and sub-model 2 (323) i.e., intermediary outputs, as well as a change in the output Y, 317, of the overall model 300.

In executing the overall model 300, the one or more sub-models (of the overall model) may be executed in a predetermined order. Specifically, a first subset of the one or more sub-models can be executed concurrently, while a second subset of the one or more sub-models may be executed sequentially. For example, referring to FIG. 3, in the execution of the overall model 300, sub-model 1 i.e., run 1, 302 and the standalone process 5, 313, can be executed in a concurrent manner, whereas sub-model 2, 303, and standalone process 7, 315 are executed sequentially after completion of execution of sub-model 1, 302, and standalone process 5, 313, respectively.

Furthermore, the attribution analysis unit 120 of FIG. 1 can be utilized to perform an attribution analysis process on the input variables X1-X7, 301, and the output variable Y, 317 of the overall model 300. Specifically, the attribution analysis unit 120 of FIG. 1, can be utilized to ascertain how a change in value of any one or more independent variable (X1-X7) affects the value of the output variable Y. Additionally, it is appreciated that the attribution analysis can be performed with respect to any intermediary output variables as well i.e., ascertain how a change in value of any one or more independent variable (X1-X7) affects the value of an intermediary output variable e.g., output variable 323 of sub-model 2.

Figure 4:
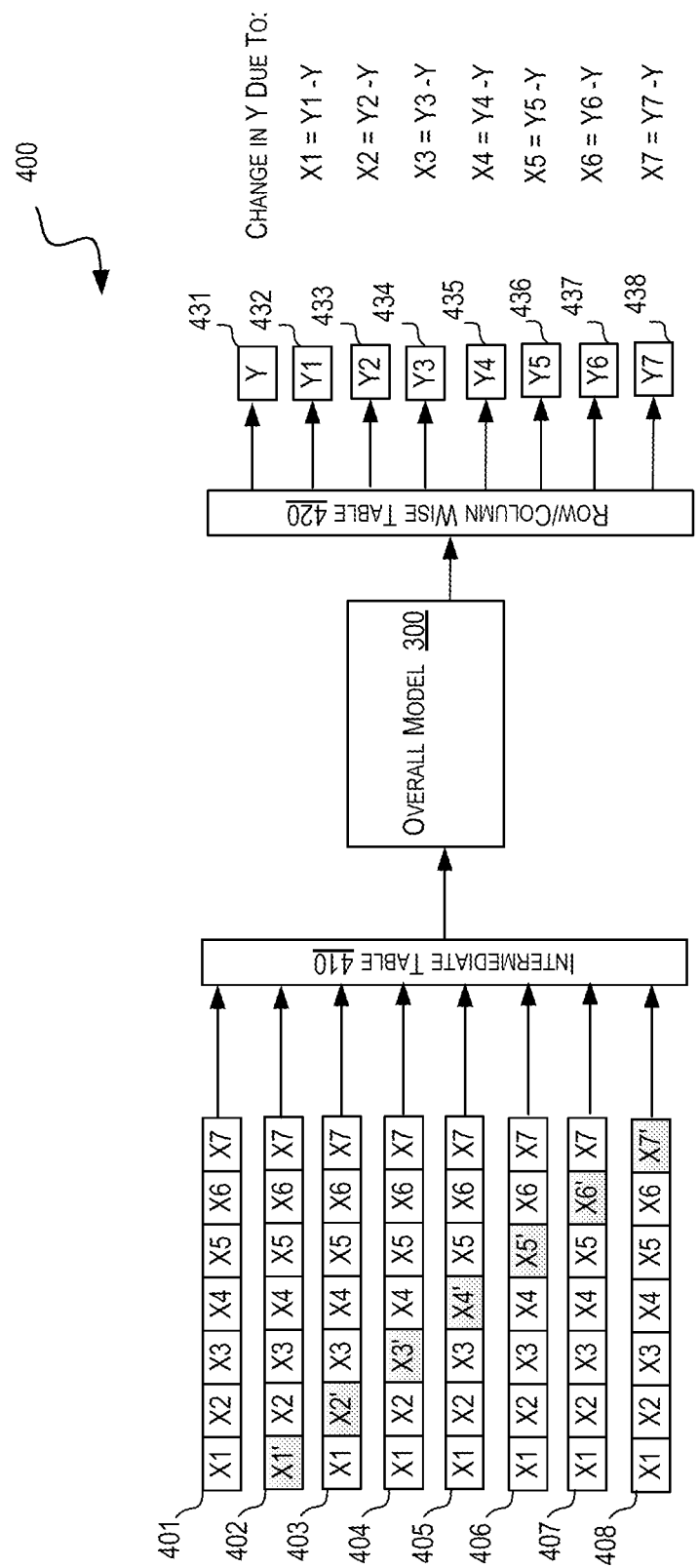
FIG. 4 illustrates an attribution analysis process in accordance with various embodiments.

FIG. 4 illustrates an attribution analysis process 400 in accordance with various embodiments. The attribution analysis process is performed by the attribution analysis unit 120 of the data processing system 100 of FIG. 1. For sake of simplicity, the attribution analysis process is described with reference to input variables X1-X7 (301) and the output variable Y, 317 of FIG. 3. As shown in FIG. 4, the overall model 300 may be configured with 7 independent variables (X1-X7). The attribution process includes two phases: (i) a base execution phase (also referred to herein as a reference execution phase), and (ii) an iterative execution phase.

In the base execution phase, values are obtained for the plurality of input variables. For example, as shown in FIG. 4, a configuration 401 (i.e., a vector of values of input variables) corresponds to an initial configuration of values for the input variables X1-X7. It is appreciated that the values for the initial configuration can be obtained from one or more external data sources or may be provided by a user. For the initial configuration of values of the input variables, the overall model is executed in order to generate a value 431 of the output variable (Y) of the overall model. The value of the output variable generated upon execution of the overall model with respect to the initial configuration is referred to herein as a base result.

Thereafter, the overall model is executed in an iterative manner for a predetermined number of iterations. According to some embodiments, the predetermined number of iterations is equal to N, where N is the number of input variables considered in the attribution analysis process. For example, in the illustration depicted in FIG. 4, the overall model is executed iteratively N=7 times, as seven input variables (i.e., X1-X7) are considered in the attribution analysis process.

In each iterative execution of the overall model, an input variable is selected (different in each iteration), and a new configuration of values for the input variables is generated. The new configuration of values of the input variables includes a value of the selected input variable in the new configuration being different that the value of the input variable in the initial configuration, whereas values of each remaining input variable in the new configuration is the same as the corresponding values of each remaining input variable in the initial configuration of values for the plurality of input variables. For example, assume that in a first iteration of the overall model, the selected input variable is X1. Then, a new configuration of values of the input variables 402 is generated, where the value of X1 is changed to X1', whereas the values of each remaining input variable (i.e., X2-X7) is kept the same (i.e., held constant) as compared to the initial configuration. It is appreciated that by some embodiments, the change in value of the selected variable (i.e., X1') is obtained as an input from the user.

Upon generating the new configuration of values of the input variables i.e., the vector of values of input variables 402, the overall model is executed to generate a new output value (a new result) of the overall model i.e., Y1, 432. A difference is computed between the new result Y1 (432) and the base result Y (431). The difference in the output variable (i.e., Y1-Y) is attributable to the change in selected input variable X1. In other words, changing the value of the input variable from X1 to X1' results in a change in the output variable of the overall model from Y to Y1.

In this manner, the overall model is iteratively executed further (i.e., six more times) to generate new output results Y2 (433) to Y7 (438), where input variables X2 to X7 are sequentially selected in each iteration to have a new value as compared to the initial configuration, while maintaining values of other input variables the same as the initial configuration. The difference in the new results (i.e., Y2 to Y7) as compared to the base result (Y) is attributed to the change in the selected input variable in each iteration. Upon completion of the N iterative executions of the overall model, a report is generated to be provided to the user. The report includes change in value of each input variable of the plurality of input variables, and associated change in the output variable of the overall model. Further, the intermediate table 410 and the row/column wise table 420 are exemplary means of illustrating changes in values of the input variables and the corresponding effects i.e., changes in the output variable of the overall model. Such tables can be graphically provided to the user of the client device (e.g., device 105 in FIG. 1) via an application interface of the attribution analysis unit 120.

According to some embodiments, the attribution analysis unit 120 verifies a validity of the initial configuration of values for the input variables e.g., X1-X7. The attribution analysis unit obtains one or more reference data sets of values for the plurality of input variables i.e., reference configurations. The attribution execution unit executes the overall model with respect to each reference configuration to obtain a reference result of the output variable of the overall model. The attribution execution unit further computes an average reference result based on reference results obtained by executing the overall model with respect to the reference configurations of values for the plurality of input variables. The attribution analysis unit computes a difference between the base result (obtained via executing the overall model with respect to the initial configuration) and the average reference result. If the computed difference is less than a preset threshold value, the attribution analysis unit determines that the initial configuration is a valid configuration and proceeds to perform the attribution analysis process with the initial configuration of values for the input variables.

It is appreciated that the above described mechanism of performing attribution analysis is in no way limited to performing attribution analysis of only the output variable of the overall model. Rather, the above described mechanism can utilized to perform attribution analysis of an intermediary output variable e.g., output variable 325 of the standalone process 5, output variable of the sub-model 303, etc., as depicted in FIG. 3. As such, the user of the client device e.g., device 105 in FIG. 1, may continuously monitor via an application interface, the output of any intermediary process e.g., sub-model of the complex analytical workflow. Thus, the data processing system 100 of FIG. 1 provisions the user to obtain (e.g., visually observe in a GUI) a change in the output value of the sub-model, while the overall model is being iteratively executed with respect to different configurations of the input variables.

According to some embodiments, when a difference in the output of the sub-model is greater than some threshold value, the data processing system may be configured to generate a message to be transmitted to the user, where the message indicates that a re-training of the at least one sub-model is to be performed. The data processing system can also be configured to transmit the message (indicating re-training of the model), when the difference in the output of the sub-model is greater than the threshold value for a predetermined number of configurations of the input variables. In this case, the data processing system can ascertain that the sub-model is consistently underperforming, and may transmit the message to indicate to the user that the sub-model is to be re-trained with a new training data set. Additionally, it is appreciated that the attribution analysis process as described herein is in no way limited to changing the value of only a single input variable in each iterative execution of the overall model. For example, by some embodiments, attribution analysis can also be performed by changing values of multiple input variables e.g., two input variables in each iteration to obtain a change in variance of the output variable of the overall model.

Figure 5:
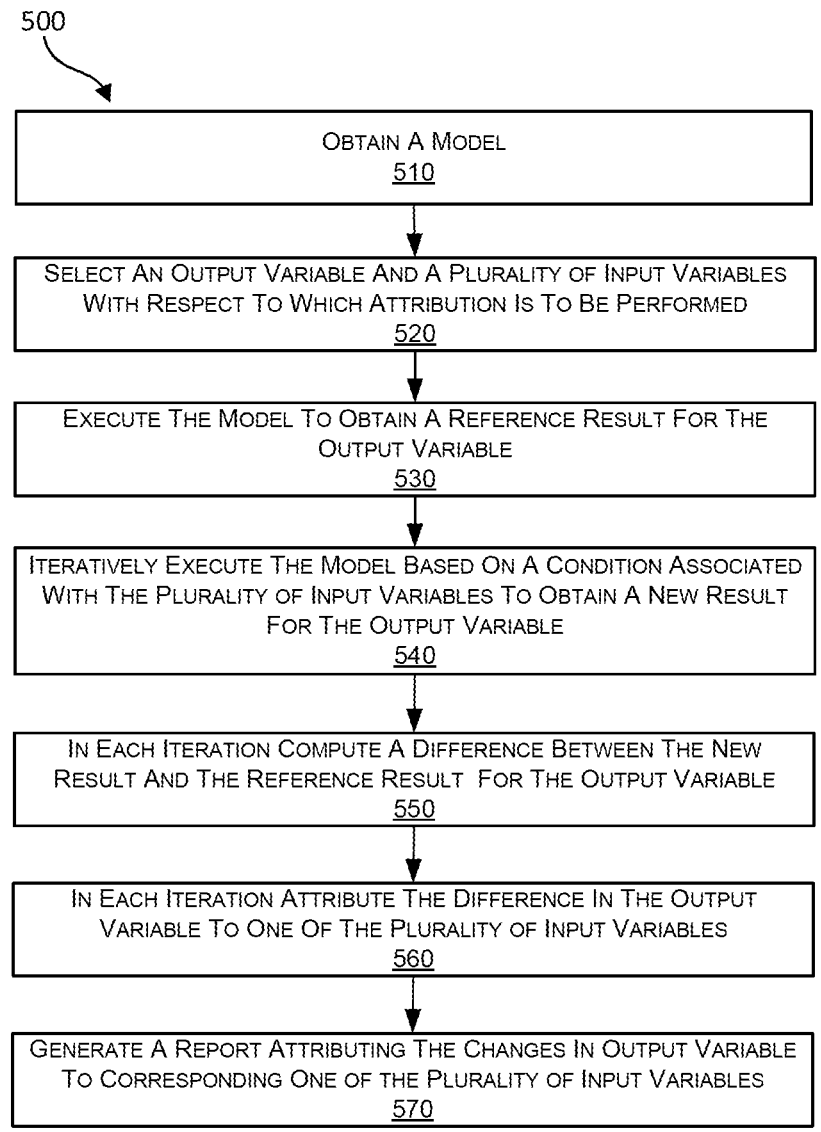
FIG. 5 depicts a flowchart illustrating an attribution analysis process in accordance with various embodiments.

FIG. 5 depicts a simplified flowchart 500 depicting an attribution analysis process performed by the data processing system of FIG. 1 according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel.

The process commences in step 510, where the data processing system obtains a model e.g., an overall model corresponding to a complex analytical workflow. It is appreciated that the user of a client device can configure/setup the overall model via the pipeline framework unit 110 of the data processing system. In step 520, the user selects an output variable of the overall model (from one or more output variables) and a plurality of input variables with respect to which an attribution process is to be performed. It is noted that the selection of the output variable and the plurality of input variables may be performed via an API provided (e.g., by the attribution analysis unit of the data processing system) to the client device.

At step 530, the overall model is executed with respect to an initial configuration of values of the plurality of input variables to obtain a reference/base result for the output variable of the overall model. Upon obtaining the base result, the process moves to step 540, where the data processing system iteratively executed the overall model based on a condition associated with the plurality of input variables to obtain a new result for the output variable of the overall model. For example, the overall model is executed in an iterative manner for a predetermined number of iterations. According to some embodiments, the predetermined number of iterations is equal to N, where N is the number of input variables considered in the attribution analysis process. In each iterative execution of the overall model, an input variable is selected (different in each iteration), and a new configuration of values for the input variables is generated. The condition associated with the plurality of input variables corresponds to the new configuration of values of the input variables including a value of the selected input variable in the new configuration being different that the value of the input variable in the initial configuration, whereas values of each remaining input variable in the new configuration being the same as the corresponding values of each remaining input variable in the initial configuration of values for the plurality of input variables.

The process then moves to step 550, where for each iteration, a difference between the new result and the reference/base result of the output variable of the overall model is computed. In step 560, the computed difference in the output variable of the overall model is attributed to one of the plurality of input variables i.e., the selected input variable whose value is changed with respect to the initial configuration of values of the plurality of input variables. Upon completion of the iterative execution of the overall model, the process in step 570, generates a report to be provided to a user e.g., visually presented in a GUI. The report includes change in value of each input variable of the plurality of input variables, and associated change in the output variable of the overall model.

Illustrative Systems

Figure 6:
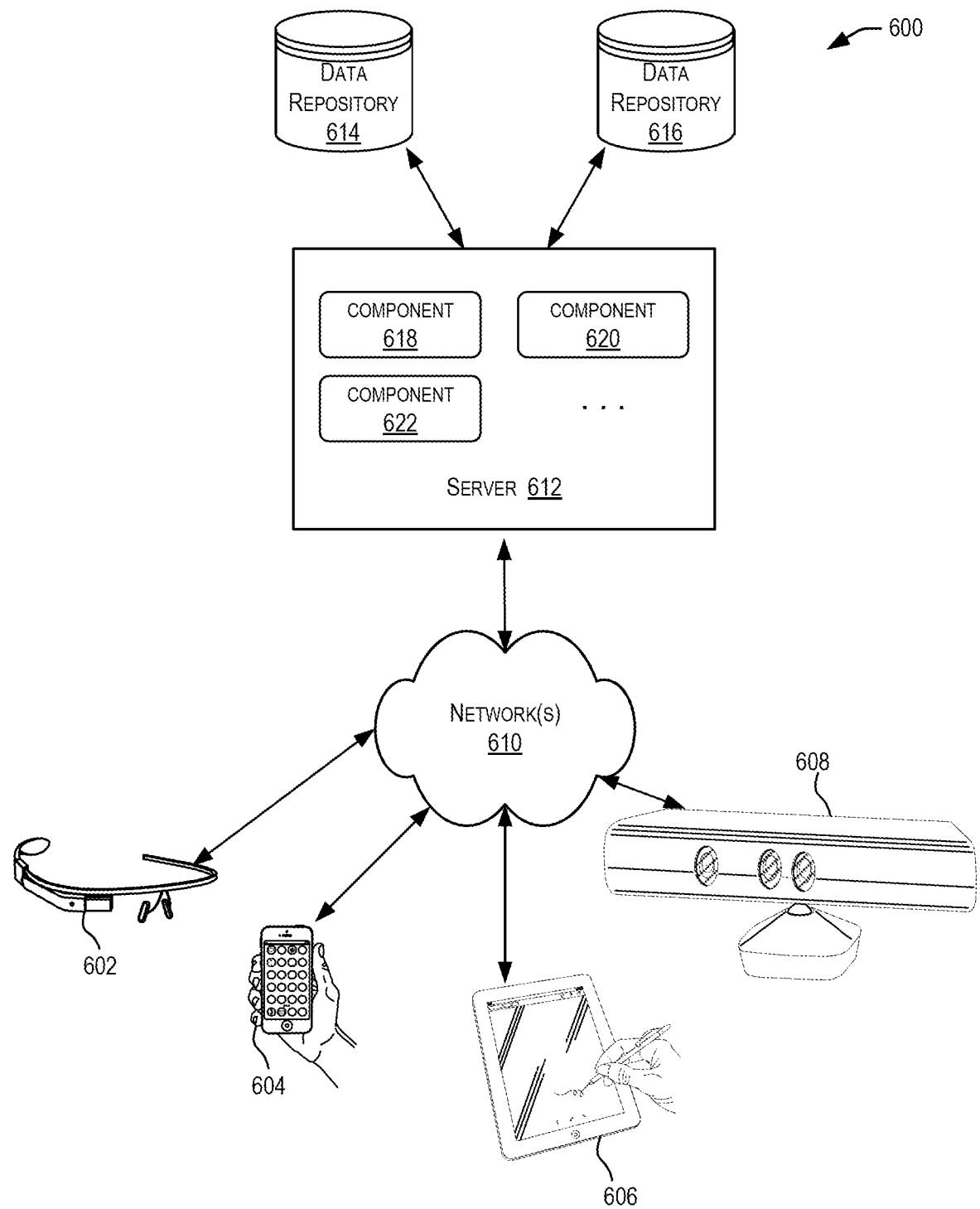
FIG. 6 depicts a simplified diagram of a distributed system for implementing various embodiments.

FIG. 6 depicts a simplified diagram of a distributed system 600. In the illustrated example, distributed system 600 includes one or more client computing devices 602, 604, 606, and 608, coupled to a server 612 via one or more communication networks 610. Clients computing devices 602, 604, 606, and 608 may be configured to execute one or more applications.

In various examples, server 612 may be adapted to run one or more services or software applications that enable one or more embodiments described in this disclosure. In certain examples, server 612 may also provide other services or software applications that may include non-virtual and virtual environments. In some examples, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The example shown in FIG. 6 is thus one example of a distributed system for implementing an example system and is not intended to be limiting.

Users may use client computing devices 602, 604, 606, and/or 608 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows® Mobil®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 may include one or more virtual machines running virtual operating systems, or other computing architectures involving virtualization such as one or more flexible pools of logical storage devices that may be virtualized to maintain virtual storage devices for the server. In various examples, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain examples. For example, one or more of the data repositories 614, 616 may be used to store information such as information related to chatbot performance or generated models for use by chatbots used by server 612 when performing various functions in accordance with various embodiments. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain examples, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 614, 616 may also be used by applications to store application data. The data repositories used by applications may be of different types such as, for example, a key-value store repository, an object store repository, or a general storage repository supported by a file system.

Figure 7:
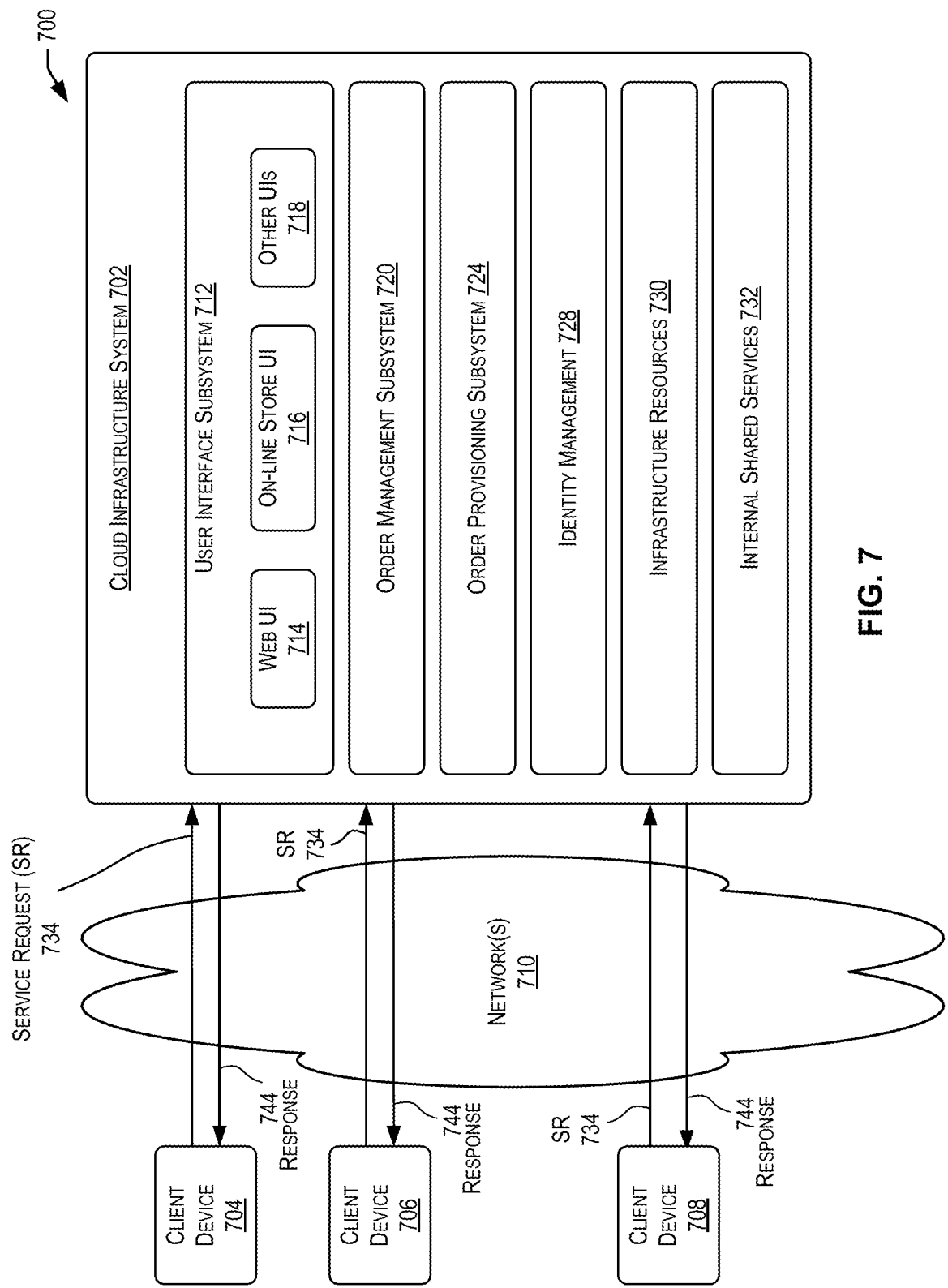
FIG. 7 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 7 is a simplified block diagram of a cloud-based system environment in which various services may be offered as cloud services in accordance with certain examples. In the example depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The example depicted in FIG. 7 is only one example of a cloud infrastructure system and is not intended to be limiting. It should be appreciated that, in some other examples, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative examples.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain examples, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer may be an individual or an enterprise. In certain other examples, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 702 and the services provided may be shared by several organizations in a related community. Various other models such as hybrids of the above mentioned models may also be used.

Client computing devices 704, 706, and 708 may be of different types (such as client computing devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request information or action from a chatbot as described in this disclosure.

In some examples, the processing performed by cloud infrastructure system 702 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 702 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like. In certain examples, the storage virtual machines that are available for servicing storage requested from applications may be part of cloud infrastructure system 702. In other examples, the storage virtual machines may be part of different systems.

In certain examples, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a service offered by cloud infrastructure system 702. As part of the order, the customer may provide information identifying a chatbot system for which the service is to be provided and optionally one or more credentials for the chatbot system.

In certain examples, such as the example depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 702 as part of the provisioning process. Cloud infrastructure system 702 may generate an application ID and select a storage virtual machine for an application from among storage virtual machines provided by cloud infrastructure system 702 itself or from storage virtual machines provided by other systems other than cloud infrastructure system 702.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 702 and information identifying a chatbot system selected by cloud infrastructure system 702 for the chatbot system corresponding to the chatbot system ID.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain examples, cloud infrastructure system 702 comprises an identity management subsystem (IMS) 728 that is configured to manage customer information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
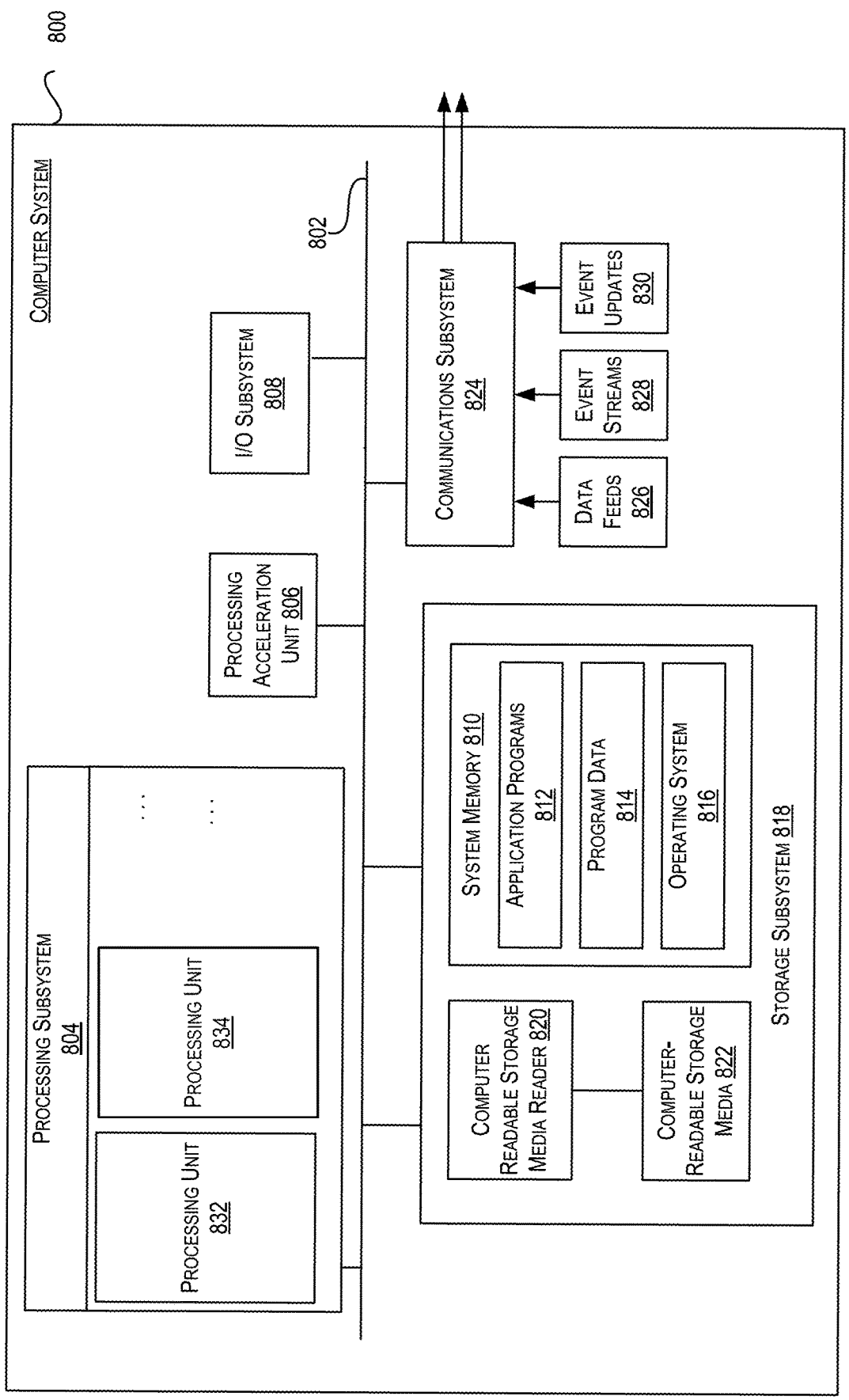
FIG. 8 illustrates an example computer system that may be used to implement various embodiments.

FIG. 8 illustrates an example of computer system 800. In some examples, computer system 800 may be used to implement any of the digital assistant or chatbot systems within a distributed environment, and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative examples of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 may be organized into one or more processing units 832, 834, etc. A processing unit may include one or more processors, one or more cores from the same or different processors, a combination of cores and processors, or other combinations of cores and processors. In some examples, processing subsystem 804 may include one or more special purpose co-processors such as graphics processors, digital signal processors (DSPs), or the like. In some examples, some or all of the processing units of processing subsystem may be implemented using customized circuits, such as application specific integrated circuits (ASICs), or field programmable gate arrays (FPGAs).

In some examples, the processing units in processing subsystem 804 may execute instructions stored in system memory 810 or on computer readable storage media 822. In various examples, the processing units may execute a variety of programs or code instructions and may maintain multiple concurrently executing programs or processes. At any given time, some or all of the program code to be executed may be resident in system memory 810 and/or on computer-readable storage media 822 including potentially on one or more storage devices. Through suitable programming, processing subsystem 804 may provide various functionalities described above. In instances where computer system 800 is executing one or more virtual machines, one or more processing units may be allocated to each virtual machine.

In certain examples, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some examples. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide authentication in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some examples. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 818 may also include a computer-readable storage media reader 820 that may further be connected to computer-readable storage media 822. Reader 820 may receive and be configured to read data from a memory device such as a disk, a flash drive, etc.

In certain examples, computer system 800 may support virtualization technologies, including but not limited to virtualization of processing and memory resources. For example, computer system 800 may provide support for executing one or more virtual machines. In certain examples, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, when computer system 800 is used to implement bot system 120 depicted in FIG. 1, the communication subsystem may be used to communicate with a chatbot system selected for an application.

Communication subsystem 824 may support both wired and/or wireless communication protocols. In certain examples, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 824 may provide wired network connectivity (e.g., Ethernet) in addition to or instead of a wireless interface.

Communication subsystem 824 may receive and transmit data in various forms. In some examples, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 824 may be configured to receive data in the form of continuous data streams, which may include event streams 828 of real-time events and/or event updates 830, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed:

1. A method comprising:
obtaining, by a data processing system, an overall model comprising one or more sub-models that are executed in a predetermined order to determine at least one output variable of the overall model;
selecting, by the data processing system, an output variable of the overall model for which attribution of changes is to be performed, and a plurality of input variables against which changes are to be attributed to;
initially executing, by the data processing system, the overall model by: (i) obtaining a data set of values for the plurality of input variables, (ii) executing the one or more sub-models in the predetermined order based on the data set of values for the plurality of input variables, and (iii) generating a base result for the output variable of the overall model based on the executing of the one or more sub-models;
iteratively executing, by the data processing system, the overall model, wherein each iterative execution of the overall model comprises: (i) selecting an input variable from the plurality of input variables, wherein the input variable selected is different in each iteration, (ii) generating a new data set of values for the plurality of input variables, wherein a value of the input variable in the new data set of values is different that the value of the input variable in the data set of values for the plurality of input variable, and values of each remaining input variable in the new data set of values is same as the values of each remaining input variables in the data set of values for the plurality of input variables, (iii) executing the one or more sub-models in the predetermined order based on the new data set of values for the plurality of input variable, (iv) generating a new result for the output variable of the overall model based on the executing of the one or more sub-models, (v) determining a difference between the base result and the new result, and (vi) attributing the difference to the input variable selected; and
generating a report to be provided to a user, wherein the report includes change in value of each input variable of the plurality of input variables, and associated change in the output variable of the overall model.

2. The method of claim 1, wherein the overall model is executed iteratively N times, wherein N is a number of input variables of the plurality of input variables, and the output variable is a function of the plurality of input variables.

3. The method of claim 1, wherein executing the one or more sub-models in the predetermined order includes executing a first subset of the one or more sub-models concurrently, and executing a second subset of the one or more sub-models sequentially.

4. The method of claim 1, wherein the data set of values for the plurality of input variables is obtained via an application programming interface from one or more data sources external to the data processing system.

5. The method of claim 1, wherein initially executing, by the data processing system, the overall model further comprises:
obtaining one or more reference data sets of values for the plurality of input variables;
executing the one or more sub-models with respect to each reference data set of values for the plurality of input variables to obtain a reference result of the output variable of the overall model;
computing an average reference result based on reference results corresponding to the one or more reference data sets of values for the plurality of input variables;
determining a first difference between the base result and the average reference result; and
utilizing the data set of values for the plurality of input variables in initial execution of the overall model in response to the first difference being less than a threshold value.

6. The method of claim 1, wherein iteratively executing, by the data processing system, the overall model further comprises:
obtaining, via an application programming interface, a first change in an output value of at least one sub-model with respect to the new data set of values for the plurality of input variables.

7. The method of claim 6, further comprising:
determining whether the first change in the output value of at least one sub-model is greater than a threshold value; and
responsive to the first change being greater than the threshold value, generating a message to be transmitted to the user, the message indicating that a re-training of the at least one sub-model is to be performed.

8. A computing device comprising:
a processor; and
a memory including instructions that, when executed with the processor, cause the computing device to, at least:
obtain an overall model comprising one or more sub-models that are executed in a predetermined order to determine at least one output variable of the overall model;
select an output variable of the overall model for which attribution of changes is to be performed, and a plurality of input variables against which changes are to be attributed to;
initially execute the overall model by: (i) obtaining a data set of values for the plurality of input variables, (ii) executing the one or more sub-models in the predetermined order based on the data set of values for the plurality of input variables, and (iii) generating a base result for the output variable of the overall model based on the executing of the one or more sub-models;
iteratively execute the overall model, wherein each iterative execution of the overall model comprises: (i) selecting an input variable from the plurality of input variables, wherein the input variable selected is different in each iteration, (ii) generating a new data set of values for the plurality of input variables, wherein a value of the input variable in the new data set of values is different that the value of the input variable in the data set of values for the plurality of input variable, and values of each remaining input variables in the new data set of values is same as the values of each remaining input variable in the data set of values for the plurality of input variable, (iii) executing the one or more sub-models in the predetermined order based on the new data set of values for the plurality of input variable, (iv) generating a new result for the output variable of the overall model based on the executing of the one or more sub-models, (v) determining a difference between the base result and the new result, and (vi) attributing the difference to the input variable selected; and generate a report to be provided to a user, wherein the report includes change in value of each input variable of the plurality of input variables, and associated change in the output variable of the overall model.

9. The computing device of claim 8, wherein the overall model is executed iteratively N times, wherein N is a number of input variables of the plurality of input variables, and the output variable is a function of the plurality of input variables.

10. The computing device of claim 8, wherein executing the one or more sub-models in the predetermined order includes executing a first subset of the one or more sub-models concurrently, and executing a second subset of the one or more sub-models sequentially.

11. The computing device of claim 8, wherein the data set of values for the plurality of input variables is obtained via an application programming interface from one or more external data sources.

12. The computing device of claim 8, wherein the processor is further configured to:

obtain one or more reference data sets of values for the plurality of input variables;

execute the one or more sub-models with respect to each reference data set of values for the plurality of input variables to obtain a reference result of the output variable of the overall model;

compute an average reference result based on reference results corresponding to the one or more reference data sets of values for the plurality of input variables;

determine a first difference between the base result and the average reference result; and utilize the data set of values for the plurality of input variables in initial execution of the overall model in response to the first difference being less than a threshold value.

13. The computing device of claim 8, wherein the processor is further configured to:

obtain, via an application programming interface, a first change in an output value of at least one sub-model with respect to the new data set of values for the plurality of input variables.

14. The computing device of claim 13, wherein the processor is further configured to:

determine whether the first change in the output value of at least one sub-model is greater than a threshold value; and responsive to the first change being greater than the threshold value, generate a message to be transmitted to the user, the message indicating that a re-training of the at least one sub-model is to be performed.

15. A non-transitory computer readable medium storing specific computer-executable instructions that, when executed by a processor, cause a computer system to at least:

obtain an overall model comprising one or more sub-models that are executed in a predetermined order to determine at least one output variable of the overall model;

select an output variable of the overall model for which attribution of changes is to be performed, and a plurality of input variables against which changes are to be attributed to;

initially execute the overall model by: (i) obtaining a data set of values for the plurality of input variables, (ii) executing the one or more sub-models in the predetermined order based on the data set of values for the plurality of input variables, and (iii) generating a base result for the output variable of the overall model based on the executing of the one or more sub-models;

iteratively execute the overall model, wherein each iterative execution of the overall model comprises: (i) selecting an input variable from the plurality of input variables, wherein the input variable selected is different in each iteration, (ii) generating a new data set of values for the plurality of input variables, wherein a value of the input variable in the new data set of values is different that the value of the input variable in the data set of values for the plurality of input variable, and values of each remaining input variables in the new data set of values is same as the values of each remaining input variable in the data set of values for the plurality of input variable, (iii) executing the one or more sub-models in the predetermined order based on the new data set of values for the plurality of input variable, (iv) generating a new result for the output variable of the overall model based on the executing of the one or more sub-models, (v) determining a difference between the base result and the new result, and (vi) attributing the difference to the input variable selected; and generate a report to be provided to a user, wherein the report includes change in value of each input variable of the plurality of input variables, and associated change in the output variable of the overall model.

16. The non-transitory computer readable medium of claim 15, wherein the overall model is executed iteratively N times, wherein N is a number of input variables of the plurality of input variables, and the output variable is a function of the plurality of input variables.

17. The non-transitory computer readable medium of claim 15, wherein the data set of values for the plurality of input variables is obtained via an application programming interface from one or more external data sources.

18. The non-transitory computer readable medium of claim 15, wherein the computer system is further configured to:

obtain one or more reference data sets of values for the plurality of input variables;

execute the one or more sub-models with respect to each reference data set of values for the plurality of input variables to obtain a reference result of the output variable of the overall model;

compute an average reference result based on reference results corresponding to the one or more reference data sets of values for the plurality of input variables;

determine a first difference between the base result and the average reference result; and utilize the data set of values for the plurality of input variables in initial execution of the overall model in response to the first difference being less than a threshold value.

19. The non-transitory computer readable medium of claim 15, wherein the computer system is further configured to:

obtain, via an application programming interface, a first change in an output value of at least one sub-model with respect to the new data set of values for the plurality of input variables.

20. The non-transitory computer readable medium of claim 19, wherein the computer system is further configured to:

determine whether the first change in the output value of at least one sub-model is greater than a threshold value; and responsive to the first change being greater than the threshold value, generate a message to be transmitted to the user, the message indicating that a re-training of the at least one sub-model is to be performed.

\* \* \* \* \*